US005533463A

United States Patent [19]
Marchetti et al.

[11] Patent Number: 5,533,463
[45] Date of Patent: Jul. 9, 1996

[54] HULL STRUCTURE OF NONMETALLIC MATERIAL

[75] Inventors: Giorgio Marchetti; Giovanni Guzzo, both of Sarzana, Italy

[73] Assignee: Intermarine S.p.A., Sarzana, Italy

[21] Appl. No.: 321,809

[22] Filed: Oct. 12, 1994

[30] Foreign Application Priority Data

Oct. 13, 1993 [IT] Italy .................................. GE93A0087

[51] Int. Cl.$^6$ ...................................................... B63B 5/24
[52] U.S. Cl. ........................................ 114/357; 114/74 R
[58] Field of Search ..................................... 114/355, 356, 114/357, 358, 65 R, 83, 84; 220/901

[56] References Cited

U.S. PATENT DOCUMENTS

| | | | |
|---|---|---|---|
| 2,158,214 | 5/1939 | Bester ........................ | 114/83 |
| 2,506,549 | 5/1950 | Kervarrec .................... | 114/83 |
| 3,282,761 | 11/1966 | Evangelist ................... | 114/357 |
| 3,806,971 | 4/1974 | Elling . | |
| 4,678,439 | 7/1987 | Schlichthorst . | |
| 4,719,871 | 1/1988 | Fantacci et al. . | |

FOREIGN PATENT DOCUMENTS 2393720  5/1979  France .

OTHER PUBLICATIONS

Transactions of the Society of Naval Architects and Marine Engineers, 73, (1965) 415/449, *Fiberglass-Reinforced Plastic Minesweepers,* Spaulding et al. pp. 428–430.

Naval Engineers Journal, Oct. 1971, *Glass Reinforced Plastic Developments For Application to Minesweeper Construction,* Lankford et al., pp. 13–26.

Schiff und Hafen, Heft 9, Jan. 25, 1973, *Largest Plastic Minehunter,* pp. 755–762.

*Primary Examiner*—Stephen Avila
*Attorney, Agent, or Firm*—Larson and Taylor

[57] ABSTRACT

A hull structure of nonmetallic material, in particular of a reinforced plastics material, for boats, ships, minesweepers and the like includes a preferably one-piece shell (1) and at least one deck (2, 2'). A plurality of ribs (3) are distributed along the length of the hull and extend across the corresponding transverse section of the shell (1). A plurality of transverse members (4, 4') (known as beams) extend directly underneath the deck (2, 2'). In order to give the hull greater structural strength and make it lighter, each transverse rib (3) joined to the shell (1) is connected (103, 203) to a corresponding transverse member (4, 4') joined to the deck (2, 2') and to continuous fore and aft members (15) (girders) passing in the manner of bulkheads, so as to form a single one-piece frame with the keel member.

12 Claims, 4 Drawing Sheets

HULL STRUCTURE OF NONMETALLIC MATERIAL

BACKGROUND OF THE INVENTION

The invention relates to a hull structure of nonmetallic material, in particular of a reinforced plastics material, for boats, ships, minesweepers and the like, which structure comprises a preferably one-piece shell and at least one deck and has a plurality of ribs which are distributed along the length of the hull and extend across the corresponding transverse section of said shell and a plurality of transverse members (known as beams) which extend directly underneath the deck.

SUMMARY OF THE INVENTION

The object of the invention is to provide a hull structure of the above-described type, which by means of an extremely simple structural design has greater structural strength and less weight without affecting the qualities of hulls made of nonmetallic materials, in particular of reinforced plastics materials.

The invention achieves the above objects with a hull structure of the above-described type in which each transverse rib joined to the shell is connected to a corresponding transverse member joined to the deck so as to form a single one-piece frame with continuous fore and aft members supporting the decks.

Where there are a plurality of decks one above the other, to each of which a plurality of transverse members are joined, one transverse member of each respective deck may be connected to each individual rib.

Another feature is that the hull structure comprises an engine room which is bounded by vertical bulkheads, while each engine is suspended by an annular engine cradle fixed to the bulkheads and to the deck overhead which forms the upper surface of the engine room.

The engine cradle or cradles are made in one piece and each of them consists of at least one, and preferably two, annular one-piece frames that are vertical and parallel with each other. The annular frames of each engine cradle may be connected to each other along their bottommost sides by one or more crosspieces.

The length of the crosspieces may be such as to connect together the engine cradles of all the engines provided.

The annular frames and the crosspieces may be connected in such a way as to form a single one-piece engine seating resembling a cage.

The hull may possess a plurality of tanks for diesel oil, water or other fluids, and these are fixed at their fore and aft ends to corresponding bulkheads in the hull structure and also rest on the hull structure at intermediate points via elastic suspensions. The elastic suspensions may be made of any material, e.g. rubber, expanded plastics material and the like.

The above arrangements result in a hull having greater structural strength while at the same time its weight, and therefore also materials and costs, are limited. The arrangements according to the invention are furthermore easy and inexpensive to put into practice and the outlay in terms of time and manufacture is not great.

The invention also covers other features which further improve the above-described hull structure: these are disclosed hereafter.

BRIEF DESCRIPTION OF THE DRAWINGS

The special features of the invention and the advantages derived therefrom are described in further detail in the description of a preferred embodiment, illustrated by way of a non-restrictive example in the accompanying drawings, in which.

DESCRIPTION OF THE PREFERRED EMBODIMENT OF THE INVENTION

Figure 1:
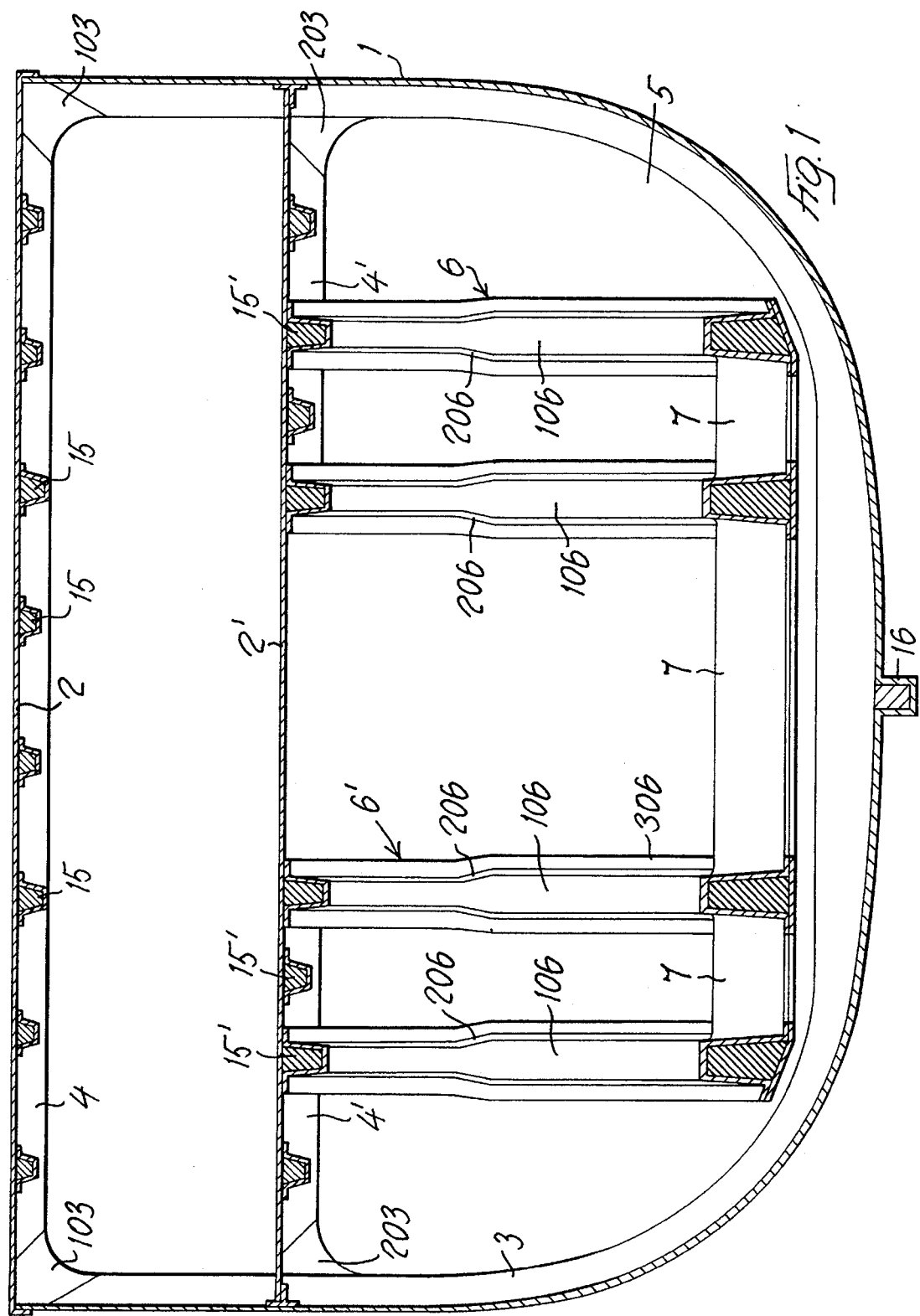
FIG. 1 is a view in transverse section of the hull structure according to the invention at the location of the engine room.

A hull structure of nonmetallic material, in particular of a reinforced plastics material (FIG. 1) comprises a shell 1 and at least one deck 2. The skin of the shell 1 and deck 2 is comparatively thin. Attached to the internal surface of the shell 1 is a plurality of ribs 3 which extend across the internal transverse section of the shell 1. The transverse ribs 3 are distributed at intervals and parallel with each other along the length of the hull and extend as far as the top edge where the shell 1 joins an upper deck 2. At this point each transverse rib 3 is connected at its top ends 103 to the ends of a transverse member 4, known as a beam, which extends directly underneath the corresponding deck 2.

The hull structure may also comprise a plurality of decks one above the other. FIG. 1 shows an intermediate deck 2' which forms the upper surface of the engine room. Joined to the intermediate deck 2' is a plurality of transverse members 4'. The transverse members 4' are connected likewise to the corresponding transverse ribs 3 at an intermediate point 203 thereof. In this case, however, the transverse members 4' illustrated in FIG. 1 are interrupted in the middle of the structure to allow for openings for installing or removing machinery.

Each transverse rib 3 is connected to its associated transverse members 4, 4' in such a way as to form a one-piece annular frame which therefore extends around the inside of the transverse section of the hull.

The transverse members 4, 4' of the annular frames intersect, and connect with, a plurality of fore and aft beams 15, 15' on which the decks are supported, the transverse ribs connect at their middle with the keel member 16, thereby forming a one-piece load-bearing skeleton for the skin of the decks and of the shell.

The ribs 3 and the beams 4, 4' are likewise made of a nonmetallic material, in particular a reinforced plastics material, and are fixed to the shell 1 and to the deck 2, 2'.

Figure 2:
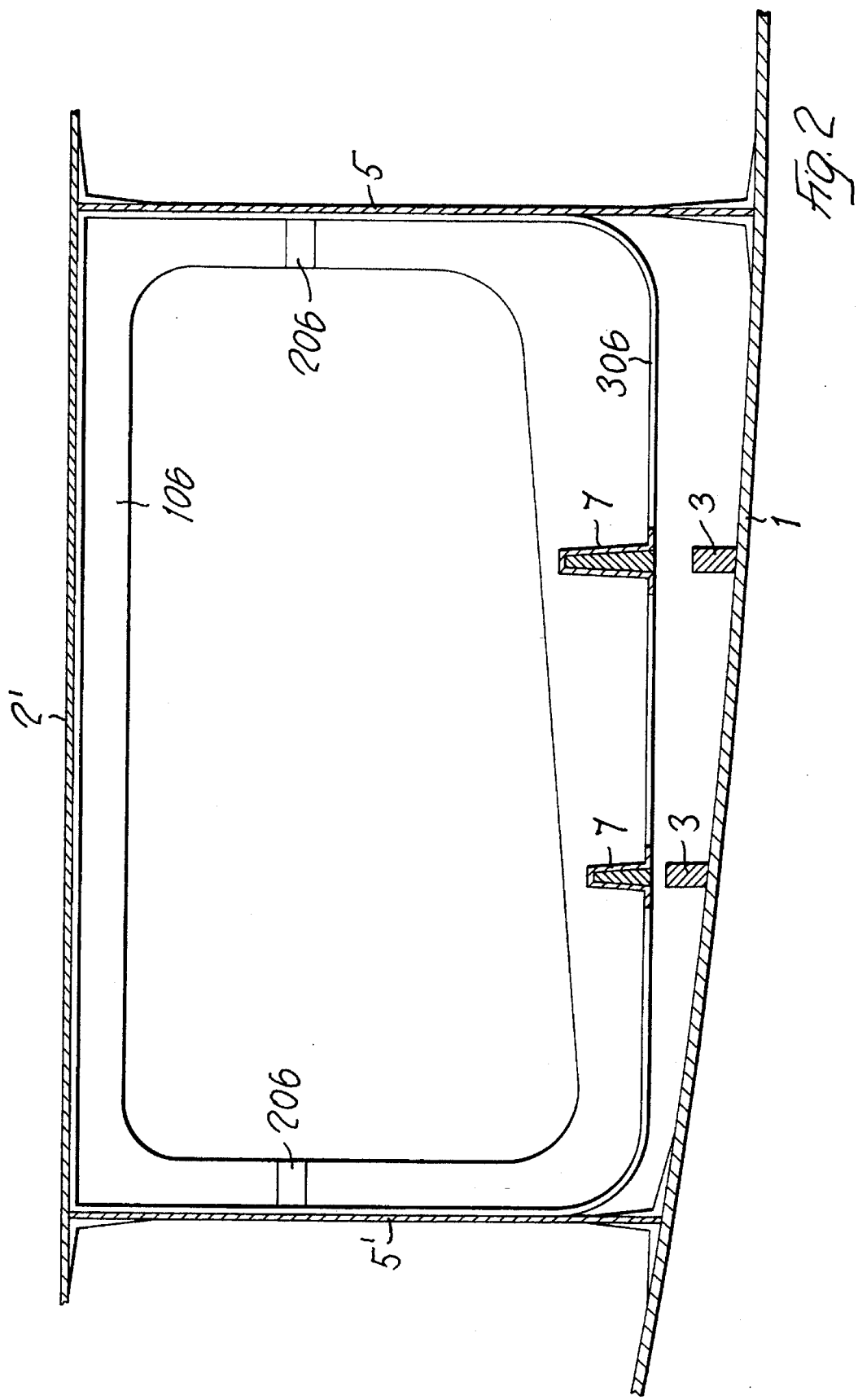
FIG. 2 is a sectional view taken through a vertical fore and aft plane of the hull structure and of an engine cradle according to the invention.
Figure 3:
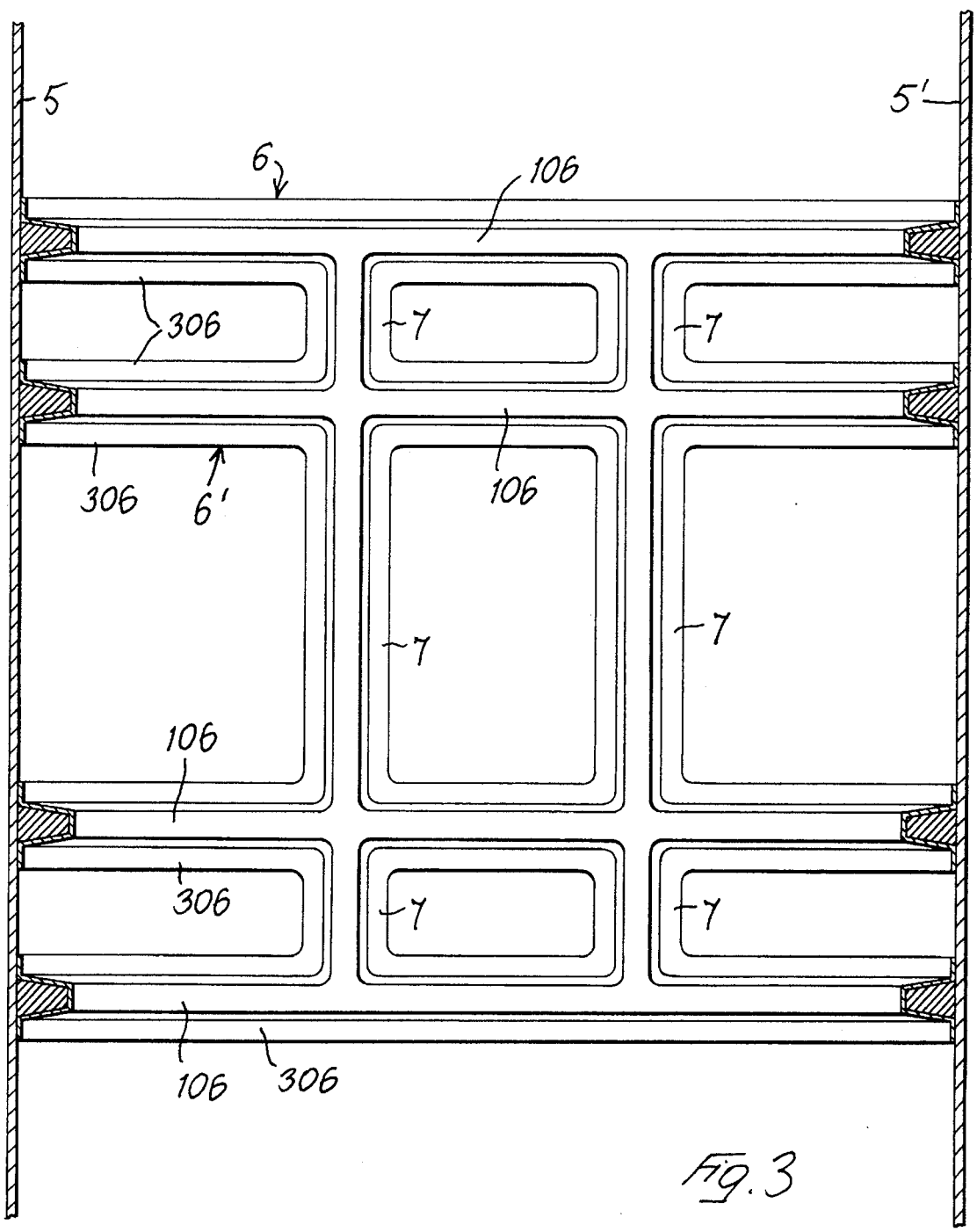
FIG. 3 is a section taken through a horizontal fore and aft plane of the hull structure and of the engine cradle.

With reference to FIGS. 1 to 3, the engine room is bounded by two opposite transverse bulkheads 5, 5' which are vertical and parallel to each other and are fixed to the hull structure, in particular to the shell 1 and to the intermediate deck 2'. Fixed in a suspended position to said two bulkheads 5, 5' and to the deck 2' is a cradle 6 for an engine. In the example illustrated there are two engines, each of which is carried by its own engine cradle 6, 6'. The cradles 6, 6' are side by side and parallel with each other. The engine cradles 6, 6' consist of one or more—in particular two—annular one-piece frames 106 located side by side at a certain distance from each other and in form are basically rectangular or quadrilateral. Said frames 106 are positioned vertically and are oriented in the fore and aft direction of the hull (FIG. 2). Their bottommost side stands a certain distance off the underlying shell 1. The annular frames 106 of each engine cradle 6, 6' are fixed separately to the bulkheads 5, 5' and to the intermediate deck 2'. Each engine is designed to rest on the lower members of the annular cradles 6,6', inside these cradles.

The annular frames 106 are formed by a tubular, preferably trapezoidal, section which becomes broader towards the external periphery, where both its sides have a lateral flange 306 that is preferably continuous. The tubular section may be hollow or internally reinforced.

As can be seen in FIGS. 1 and 2, at about the height of the horizontal mid plane of the engine cradles 6, 6', and preferably slightly above this, the tubular sections become laterally narrower 206 in cross section. Therefore the cross section of the annular frames 106 is greater at the bottom than at the top.

The annular frames 106 of each engine cradle 6, 6' are connected together at the lower members by crosspieces 7. The crosspieces 7 may continue beyond the engine cradles 6, 6' of each engine so as to connect together the cradles 6, 6' of all the engines provided. In the same way the upper members of the annular frames 106 and/or the annular engine cradles 6, 6' may optionally be connected together.

The crosspieces 7 are at the same level as the bottommost sides of the engine cradles 6, 6' and flush with them above the bottom of the shell 1. They may be formed by sections similar to those used for the cradles themselves. The annular frames 106 and the crosspieces 7 are preferably connected together in such a way as to form a one-piece cradle seating resembling a cage which is thus extremely light but has great structural strength and enables the advantages of suspended engine support to be exploited.

In a similar way to the construction of the engine cradles 6, 6', the transverse ribs 3 and transverse members 4, 4' making up the one-piece frames of the hull may also be formed by tubular sections of similar cross-sectional form.

Another feature is that the hull structure is also provided with tanks 8 for fuel, water or other fluids. The tanks 8 consist of a tubular, preferably cylindrical body whose fore and aft ends are open. At these fore and aft ends the tanks 8 have a peripheral flange 108 by which they are hermetically fastened to two opposite vertical bulkheads 9 of the hull structure which thus form the ends of the tubular body.

Figure 4:
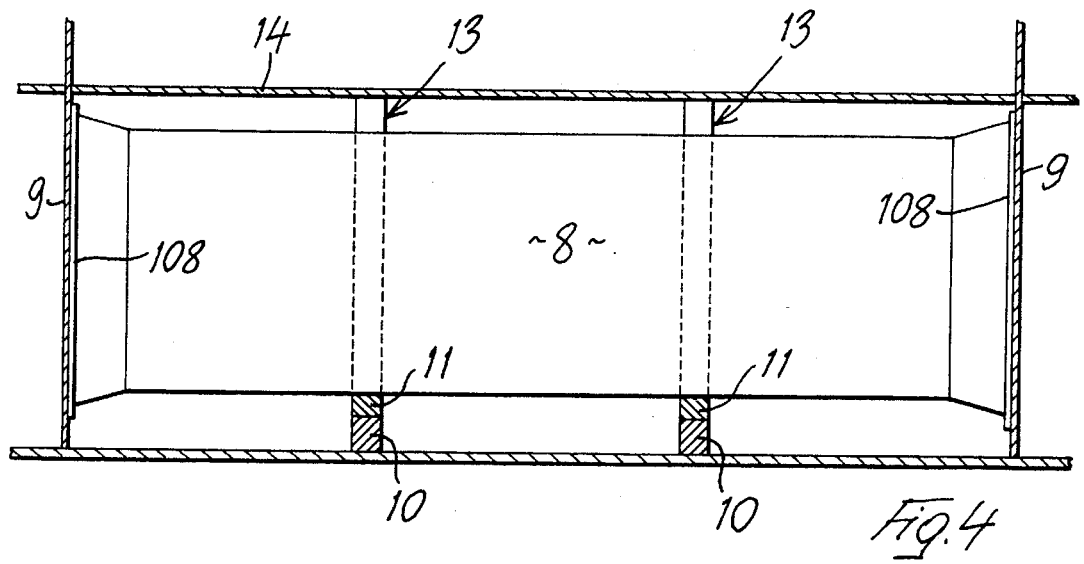
FIG. 4 is a section taken through a fore and aft vertical plane of the hull at the location of the tank room.
Figure 5:
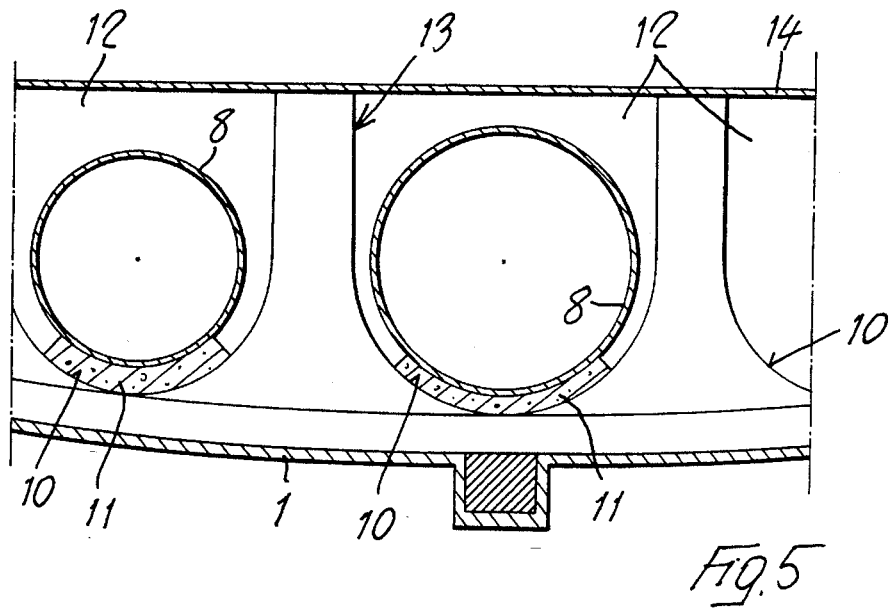
FIG. 5 is a view in transverse section of the tank room according to FIG. 4.

The tanks 8 are supported, by the bulkheads 9 a certain distance off the bottom of the tank room, and in particular off the shell 1. At one or more intermediate points, in particular at two intermediate points set apart axially from each other, the tubular bodies of the tanks 8 also rest on transverse ribs 10 with elastic suspensions 11 interposed between the tanks 8 and the ribs 10. These elastic suspensions 11 may be made from any material, e.g. an expanded plastics material, rubber, or the like. In the particular form shown in FIGS. 4 and 5, the ribs 10 consist of the bottommost edge of windows 12 let into intermediate vertical walls 13. Said intermediate walls 13 are fixed to the ribs of the bottom of the tank room, and the ribs in turn are connected to the shell 1. In particular, said intermediate walls 13 connect together the bottom of the tank room and its upper surface or "'tween deck" 14 above the latter. The windows 12 are open up to the topmost edge of the intermediate walls 13, while the bottommost edge thereof, which forms the transverse rib 10 on which the corresponding tank 8 rests, is essentially complementary in shape to the transverse section of the tubular body of that tank.

In conclusion, the strong structure of the hull is to be regarded as consisting in the fore and aft structure of the continuous members running underneath the decks, in the continuous transverse ribs running in a closed hoop around the hull and in the keel.

The resulting structural framework ensures the flexural strength of the upper deck and forecastle deck, while at the keel the strength is ensured by the structure of the keel itself connected to the fore and aft members of the 'tween deck by the transverse ribs and by the intermediate walls.

We claim:

1. A hull structure of reinforced plastics material comprising:

a one-piece shell having a longitudinal axis defining a longitudinal direction and a transverse direction perpendicular to the longitudinal axis;

an upper deck and an intermediate deck;

a plurality of transverse ribs distributed at spaced locations along the length of said shell, each said transverse rib being attached along a corresponding inner surface of a transverse section of said shell;

a plurality of upper transverse members extending directly underneath of said upper deck and attached thereto, and a plurality of intermediate transverse members extending directly underneath of said intermediate deck and attached thereto, each said upper and intermediate transverse member being attached to a corresponding said transverse rib so that the attached said transverse rib and transverse members form a single one-piece open frame;

upper longitudinal members attached to an underside of said upper deck and to ones of said plurality of upper transverse members, and intermediate longitudinal members attached to an underside of said intermediate deck and to ones of said plurality of intermediate transverse members;

a pair of transverse bulkheads provided in said shell;

a plurality of tanks for holding fluids, each said tank including a fore end and an aft end attached respectively to one of said bulkheads for mounting said tanks in a suspended position above a bottom of said shell;

at least two vertical intermediate walls located spaced from one another between said pair of bulkheads,
   each said vertical intermediate wall being fixed to a respective said transverse rib attached to said shell and to said intermediate deck, and
   each said vertical intermediate wall including a plurality of windows through which respective ones of said plurality of tanks extend, a bottom portion of each window forming an intermediate transverse rib which supports the respective said tank; and a plurality of elastic suspensions provided between a respective intermediate transverse rib and said tank supported thereby.

2. A hull structure as claimed in claim 1 wherein said transverse ribs include upper free ends, said upper free ends being connected to said upper transverse members.

3. A hull structure as claimed in claim 1 and further including an engine room for two engines, said engine room including two second transverse bulkheads, an overhead deck, and two annular engine cradles in which a respective engine is suspended, said two annular engine cradles being spaced laterally from each other and fixed to said second transverse bulkheads and to said overhead deck.

4. A hull structure as claimed in claim 3 wherein each said engine cradle is made in one piece and includes a pair of annular one-piece frames which are positioned vertically side by side parallel with each other and spaced from each other, each said annular frame being fixed separately to said second transverse bulkheads and to said overhead deck.

5. A hull structure as claimed in claim 4 wherein each said engine cradle includes at least one crosspiece connecting a bottommost portion of each pair of annular frames.

6. A hull structure as claimed in claim 5 wherein said crosspieces for each said engine cradle also are connected together to connect said engine cradles together.

7. A hull structure as claimed in claim 6 wherein said annular frames are quadrilaterally shaped.

8. A hull structure as claimed in claim 7 wherein said annular frames are oriented parallel to the longitudinal direction.

9. A hull structure as claimed in claim 5 wherein said transverse ribs, said transverse members, said annular frames, and said crosspieces are made of tubular sections.

10. A hull structure as claimed in claim 9 wherein said tubular sections have a trapezoidal cross section and include a broader side for attachment to said shell or said deck and opposite transverse lateral flanges along said broader side.

11. A hull structure as claimed in claim 10 wherein said tubular sections forming said annular frames above approximately a horizontal mid plane of said engine cradles are smaller in cross section than tubular sections of said annular frames therebelow.

12. A hull structure as claimed in claim 1 wherein said windows in which said tanks extend include a top portion extending up to said intermediate deck.

* * * * *